United States Patent
Windhab et al.

(10) Patent No.: US 7,670,635 B2
(45) Date of Patent: *Mar. 2, 2010

(54) AERATED FROZEN SUSPENSION WITH ADJUSTED CREAMINESS AND SCOOP ABILITY BASED ON STRESS-CONTROLLED GENERATION OF SUPERFINE MICROSTRUCTURES

(75) Inventors: Erich J. Windhab, Hemishofen (DE); Uwe Tapfer, Oakland, CA (US)

(73) Assignee: Nestec S.A., Vevey (CH)

(*) Notice: Subject to any disclaimer, the term of this patent is extended or adjusted under 35 U.S.C. 154(b) by 0 days.

This patent is subject to a terminal disclaimer.

(21) Appl. No.: 12/370,528

(22) Filed: Feb. 12, 2009

(65) Prior Publication Data

US 2009/0136635 A1    May 28, 2009

Related U.S. Application Data

(63) Continuation of application No. 11/589,123, filed on Oct. 27, 2006, now abandoned, which is a continuation of application No. 10/886,151, filed on Jul. 6, 2004, now Pat. No. 7,261,913.

(60) Provisional application No. 60/485,425, filed on Jul. 7, 2003.

(51) Int. Cl.
*A23G 9/04* (2006.01)

(52) U.S. Cl. .................. 426/660; 426/67; 426/565; 426/519; 426/524; 426/100; 426/101

(58) Field of Classification Search .................. 426/67, 426/565, 660, 519, 524
See application file for complete search history.

(56) References Cited

U.S. PATENT DOCUMENTS

| | | | |
|---|---|---|---|
| 2,067,683 A | 1/1937 | Routh | 62/114 |
| 2,131,510 A | 9/1938 | Gray et al. | 62/114 |
| RE20,987 E | 1/1939 | Routh | 62/114 |
| 2,206,419 A | 7/1940 | Miller | 62/114 |
| 2,558,453 A | 6/1951 | Minster | 99/136 |

(Continued)

FOREIGN PATENT DOCUMENTS

DE    2538858 A1    3/1977

(Continued)

OTHER PUBLICATIONS

Andres Flores Mellado, *Ice Crystallization and Recrystallization in Frozen Model Solutions and Ice Cream as Affected by Polysaccharide Gums*, Thesis, Master of Science, University of Guelph, Apr. 1998.

(Continued)

*Primary Examiner*—Lien Tran
*Assistant Examiner*—Kelly Bekker
(74) *Attorney, Agent, or Firm*—Winston & Strawn LLP (57) ABSTRACT

Products that are aerated multiphase systems containing an aqueous continuous fluid phase which may include solutes thus forming an aqueous syrup and disperse phases like gas/air cells, water ice crystals and solid/semi-solid fat globules or aggregates thereof, whereas the disperse phases are that finely structured that their mean diameters are below phase specific critical maximum values and thereby generate a most preferred by consumers, full rich silky-creamy mouth feel at much lower fat content than usual in conventional related products like premium and super premium ice creams.

14 Claims, 10 Drawing Sheets

U.S. PATENT DOCUMENTS

| | | | | |
|---|---|---|---|---|
| 2,767,553 | A | 10/1956 | Lewis | 62/2 |
| 3,486,469 | A | 12/1969 | Recas | 107/54 |
| 3,922,371 | A | 11/1975 | Jullien | 426/565 |
| 4,012,533 | A | 3/1977 | Jonas | 426/565 |
| 4,020,643 | A | 5/1977 | Roberts et al. | 62/322 |
| 4,100,304 | A | 7/1978 | Getman | 426/281 |
| 4,201,558 | A | 5/1980 | Schwitters et al. | 62/70 |
| 4,244,981 | A | 1/1981 | Blake | 426/567 |
| 4,400,405 | A | 8/1983 | Morley et al. | 426/565 |
| 4,400,406 | A | 8/1983 | Morley et al. | 426/565 |
| 4,409,249 | A | 10/1983 | Forkner et al. | 426/100 |
| 4,434,186 | A | 2/1984 | Desia et al. | 426/565 |
| 4,505,943 | A | 3/1985 | Dell et al. | 426/565 |
| 4,542,035 | A | 9/1985 | Huang et al. | 426/565 |
| 4,580,905 | A | 4/1986 | Schwitters et al. | 366/149 |
| 4,703,628 | A | 11/1987 | Togashi et al. | 62/135 |
| 4,713,256 | A | 12/1987 | Chaveron et al. | 426/631 |
| 4,738,862 | A | 4/1988 | Bee | 426/565 |
| 4,758,097 | A | 7/1988 | Iles | 366/149 |
| 4,786,514 | A | 11/1988 | Wiedmann | 426/565 |
| 4,882,105 | A | 11/1989 | Volk, Jr. | 264/40.1 |
| 4,948,618 | A | 8/1990 | Hirokawa et al. | 426/603 |
| 5,000,974 | A | 3/1991 | Albersmann | 426/564 |
| 5,024,066 | A | 6/1991 | Goavec | 62/306 |
| 5,082,682 | A | 1/1992 | Peterson et al. | 426/564 |
| 5,084,295 | A | 1/1992 | Whelan et al. | 426/565 |
| 5,104,674 | A | 4/1992 | Chen et al. | 426/573 |
| 5,118,792 | A | 6/1992 | Warren et al. | 530/350 |
| 5,215,777 | A | 6/1993 | Asher et al. | 426/565 |
| 5,264,234 | A | 11/1993 | Windhab et al. | 426/519 |
| 5,292,030 | A | 3/1994 | Kateman et al. | 222/1 |
| 5,345,781 | A | 9/1994 | Fels et al. | 62/343 |
| 5,403,611 | A | 4/1995 | Tomita et al. | 426/565 |
| 5,433,967 | A | 7/1995 | Kateman et al. | 426/565 |
| 5,439,695 | A | 8/1995 | Mackey | 426/516 |
| 5,473,909 | A | 12/1995 | Kateman et al. | 62/306 |
| 5,484,614 | A | 1/1996 | Clem | 426/231 |
| 5,603,257 | A | 2/1997 | Kateman et al. | 99/455 |
| 5,617,734 | A | 4/1997 | Chase et al. | 62/343 |
| 5,620,732 | A | 4/1997 | Clemmings et al. | 426/565 |
| 5,713,209 | A | 2/1998 | Hunchar et al. | 62/68 |
| 5,758,571 | A | 6/1998 | Kateman et al. | 99/455 |
| 5,894,030 | A | 4/1999 | Gibson et al. | 426/524 |
| 5,919,510 | A | 7/1999 | Fayard et al. | 426/565 |
| 5,922,379 | A | 7/1999 | Wang | 426/138 |
| 5,957,040 | A | 9/1999 | Feola | 99/450 |
| RE36,390 | E | 11/1999 | Fels et al. | 62/68 |
| 6,001,408 | A | 12/1999 | Dudacek et al. | 426/516 |
| 6,010,734 | A | 1/2000 | Whelan | 426/565 |
| 6,082,120 | A | 7/2000 | Hoffmann et al. | 62/68 |
| 6,093,438 | A | 7/2000 | Vaghela et al. | 426/565 |
| 6,176,090 | B1 | 1/2001 | Ufema | 62/68 |
| 6,187,365 | B1 | 2/2001 | Vaghela et al. | 426/565 |
| 6,207,213 | B1 | 3/2001 | Groux et al. | 426/516 |
| 6,228,412 | B1 | 5/2001 | Groux et al. | 426/516 |
| 6,303,388 | B1 | 10/2001 | Fahy | 436/518 |
| 6,352,734 | B1 | 3/2002 | Martin, Jr. et al. | 426/565 |
| 6,432,466 | B2 | 8/2002 | Brake et al. | 426/565 |
| 6,436,460 | B1 | 8/2002 | Daniel et al. | 426/565 |
| 6,485,768 | B2 | 11/2002 | Feola | 426/231 |
| 6,491,960 | B1 | 12/2002 | Daniel et al. | 426/565 |
| 6,497,913 | B1 | 12/2002 | Gray et al. | 426/565 |
| 6,511,694 | B2 | 1/2003 | Huang et al. | 426/565 |
| 6,514,555 | B1 | 2/2003 | Fayard et al. | 426/565 |
| 6,558,729 | B1 | 5/2003 | Riviere et al. | 426/565 |
| 6,565,908 | B1 | 5/2003 | Daniel et al. | 426/565 |
| 6,596,333 | B1 | 7/2003 | Vaghela et al. | 426/565 |
| 6,598,516 | B1 | 7/2003 | Gonon | 99/455 |
| 6,613,374 | B1 | 9/2003 | Fayard et al. | 426/565 |
| 6,723,361 | B2 | 4/2004 | Feola | 426/231 |
| 6,764,701 | B1 | 7/2004 | Mochizuki et al. | 426/233 |
| 6,894,178 | B1 | 5/2005 | Windhab et al. | 554/211 |
| 2002/0102343 | A1 | 8/2002 | Spindler et al. | 426/565 |
| 2003/0211192 | A1 | 11/2003 | Bakker et al. | 425/208 |

FOREIGN PATENT DOCUMENTS

| | | |
|---|---|---|
| DE | 3918268 C1 | 7/1990 |
| DE | 4202231 C1 | 6/1993 |
| EP | 401512 A1 | 5/1990 |
| EP | 559316 A1 | 9/1993 |
| EP | 561118 A2 | 9/1993 |
| EP | 713650 A1 | 5/1996 |
| EP | 729822 B1 | 9/1996 |
| EP | 877558 B1 | 1/1997 |
| EP | 808577 A1 | 11/1997 |
| EP | 1212947 A1 | 6/2002 |
| EP | 1212948 | 6/2002 |
| JP | 56-029962 A | 3/1981 |
| JP | 60-184781 A | 9/1985 |
| JP | 62-074245 A | 6/1987 |
| JP | 62-055067 A | 10/1987 |
| JP | 64-163228 | 2/1991 |
| JP | 03-27276 A | 5/1991 |
| WO | WO 90/14775 A1 | 12/1990 |
| WO | WO 97/26800 A1 | 7/1997 |
| WO | WO 97/39637 A1 | 10/1997 |
| WO | WO 97/46114 A1 | 11/1997 |
| WO | WO 98/03079 | 1/1998 |
| WO | WO 98/17125 A1 | 4/1998 |
| WO | WO 98/18350 A1 | 5/1998 |
| WO | WO 98/09534 A3 | 12/1998 |
| WO | WO 98/09536 A3 | 12/1998 |
| WO | WO 00/72697 A1 | 12/2000 |

OTHER PUBLICATIONS

Chang Y. and Hartel R. W.,*Stability of Air Cells in Ice Cream During Hardening and Storage*, Journal of Food Engineering, 55, 2002, pp. 59-77.

Marcotte M., *Amelioration de la qualite des aliments par le developpement ou la mise au point de traitements thermiques de stabilisation. 107 Attachement C—Critical Review*, Project No. 333-1421-9307 Performing Organization, Agriculture and Agri-food Canada Research Branch Food Research and Development Center, Performing Institution.

Shane N.D. Lal; Charmian J. O'Connor and Laurence Eyres, *Application of Emulsifiers/Stabilizers in Dairy Products of High Rheology*, Advances in Colloid and Interface Science, 123-126, 2006, pp. 433-437.

Matthias D. Eisner; Hans Wildmoser and Erich J. Windhab, *Air cell Microstructuring in a High Viscous Ice Cream Matrix*, Colloids and Surfaces A: Physicochem. Eng. Aspects, 263, 2005, pp. 390-399.

Windhab, E. et al.; *New Developments in Ice Cream Freezing Technology and Related On-Line Measuring Techniques*; 1997, Ice Cream International Diary Federation, ISMN 92 9098 029 3, pp. 112-131.

Windhab, E. et al.; *New Developments in Crystallization Processing*; 1999, Journal of Thermal Analysis and Calorimetry, vol. 57, pp. 171-180.

Windhab E. et al; *Combined Aerator/Freezer for Ice Cream Manufacture*, 1995, European Dairy Magazine, vol. 1, pp. 2835.

Berk, C.C.; *Dreyer's Debuts Technique for Putting Ice Creame On A Diet*, Dow Jones Newwires; Website; Jan. 21, 2004; Dow Jones Reuters Business Interactive LLC; NY, NY.

Rosenberg A; Dreyer's Launching Light Ice Cream; *Oakland Tribune*; Jan. 23, 2004; Oakland, CA.

*Groundbreaking Ice Cream Technology*; Food Processing Magazine; Apr. 2004; Itasca, IL.

Horovitz, B., *Makers Put Fattening Ice Cream on a Diet*; USA Today; Jun. 21, 2004; International Edition, Zurich, Switzerland.

International Search Report for PCT application WO 2005/053416.

AERATED FROZEN SUSPENSION WITH ADJUSTED CREAMINESS AND SCOOP ABILITY BASED ON STRESS-CONTROLLED GENERATION OF SUPERFINE MICROSTRUCTURES

CROSS-REFERENCES TO RELATED APPLICATIONS

This application is a Continuation of U.S. application Ser. No. 11/589,123, filed on Oct. 27, 2006, now abandoned which is a Continuation of U.S. application Ser. No. 10/886,151, filed on Jul. 6, 2004, now U.S. Pat. No. 7,261,913 B2, which claims the benefit of U.S. provisional patent application No. 60/485,425, filed on Jul. 7, 2003; the contents of each of which are hereby incorporated by reference thereto.

BACKGROUND OF THE INVENTION

The present invention relates to aerated multiphase systems containing an aqueous continuous fluid phase which may include solutes, thus forming an aqueous syrup and disperse phases like gas/air cells, water ice crystals and solid/semi-solid fat globules or aggregates thereof, whereas the disperse phases are that finely structured that their mean diameters are below phase specific critical maximum values and thereby generate a most preferred by consumers, full rich silky-creamy mouth feel at much lower fat content than usual in conventional related products like premium and super premium ice creams, and processes for their manufacture.

In conventional frozen and aerated water-based ice slurries of the ice cream type, creaminess is mainly generated by a disperse fat phase forming globules with diameters between 0.5 and 2 microns, preferably below 1 micron, and/or fat globule aggregates built due to partial coalescence of the primary fat globules. Such interconnected fat globules/fat globule aggregates can form a three-dimensional network thus stabilizing the air cells in the ice cream structure, most obviously when the ice crystals are melted. Fat globule networking in particular at the air cell interface is supported by more hydrophobic fat globule surfaces. Those are more available if emulsifiers like mono-/diglycerides containing a larger fraction of unsaturated fatty acids support the de-hulling of initially protein covered fat globules in the temperature range where a major portion of the fat fraction crystallizes. In ice creams, milk fat is generally used as the main fat component for which the related relevant crystallizing temperature range is below 5 to 8° C. The well stabilized air cells are mainly responsible for the creaminess and texture sensation during ice cream melting in the mouth. The more stable the air cell/foam structure in the melted state during shear treatment between tongue and palate, the more pronounced the creaminess is perceived. Another but smaller direct contribution to the creaminess is derived from medium sized fat globule aggregates below 30 micron. If the fat globule aggregates become too large (larger than about 30-50 microns) the creamy sensation turns into a buttery, fatty mouth feel.

It has been demonstrated how the diameter reduction of the fat globules by applying higher homogenization pressure in ice cream mix preparation supports the build-up of a fat globule network, improving air cell/foam structure stability and related creaminess.

The scoop ability of frozen, aerated slurries like ice cream is mainly related to the ice crystal structure, in particular the ice crystal size and their inter-connectivity. Scoop ability is a very relevant quality characteristic of ice creams in the low temperature range between −20° C. and −15° C., right after removing from the freezer. In conventional ice cream manufacture partial freezing is done in continuous or batch freezers (=cooled scraped surface heat exchangers) down to outlet temperatures of about −5° C. Then the ice cream slurry is filled into cups or formed e.g. at the outlet of extrusion dies. Following this the products are hardened in freezing systems with coolant temperatures of around −40° C. until a product core temperature of about −20° C. is reached. Then the products are stored and/or distributed. After the pre-freezing step in the scraped surface heat exchanger (=ice cream freezer) in conventional ice cream recipes, about 40-45% of the freezable water is frozen as water ice crystals. Another fraction of about 25-30% is still liquid. Most of this fraction freezes during further cooling in the hardening system. In this production step, the ice cream is in a state of rest. Consequently the additionally frozen water crystallizes at the surfaces of the existing ice crystals, thus causing their growth from about 20 microns to 50 microns and larger. Some of the initial ice crystals are also interconnected thus forming a three-dimensional ice crystal network. If such a network is formed the ice cream behaves like a solid body and the scoop ability becomes very poor.

It has been shown that the ice crystal growth during cooling/hardening is claimed to be restricted by the use of anti-freeze proteins. This is also expected to have a positive impact on the ice crystal connectivity with respect to improved scoop ability.

It has also been claimed that the use of other specific ingredients like low melting vegetable fat, polyol fatty acid polyesters or specific sugars like sucrose/maltose mixtures are claimed to soften the related ice cream products thus improving scoop ability and creaminess.

Finally reference has been made to specific processing equipment, mostly single or twin screw cooled extruders, in order to modify the ice cream microstructure for improving the texture and stability properties.

It has not yet been recognized that all of the disperse phases in aerated frozen ice cream-like slurries can be reduced or modified in size and/or connectivity on the basis of a mechanical shear treatment principle. Thus the mechanical shear treatment principle can effectively contribute to the adjustment of microstructure related quality characteristics like scoop ability and creaminess.

SUMMARY OF THE INVENTION

The present invention provides products that are aerated multiphase systems containing an aqueous continuous fluid phase which may include solutes thus forming an aqueous syrup and disperse phases like gas/air cells, water ice crystals and solid/semi-solid fat globules or aggregates thereof, whereas the disperse phases are that finely structured that their mean diameters are below phase specific critical maximum values and thereby generate a most preferred by consumers, full rich silky-creamy mouth feel at much lower fat content than usual in conventional related products like premium and super premium ice creams.

The present invention also provides a process that may use a variety of mechanical moving tools like stirrers, rollers, bands, blades and the-like as the mechanical first major component to generate a uniform shear flow field between them or between them and fixed walls. The second major component of the inventive process is a thermal cooling system which cools the moving or fixed tools/walls down to temperatures slightly warmer than the glass transition temperature Tg' of the multiphase fluid system. According to the inventive idea the mechanical stresses acting in the process are applied in such a way that each volume unit of the fluid system experiences the same stress history (=same stresses and same stress-related residence times). At the same time the applied shear treatment is adjusted such, that the heat transfer from the fluid to the cooling agent in a final treatment state of the fluid system, with more than 60-70% of the freezable watery fluid phase forming ice crystals, and/or the total disperse solids content in the non aerated material fraction (water ice crystals+fat globules+eventually other disperse solids) exceeding 50% vol., is still sufficient to transfer the heat generated by viscous friction due to shearing of the material to the cooling agent without re-melting the partially frozen aerated system.

Surprisingly it was found, that when shear stresses within a distinct range of 5000-75000 Pa, preferably 10000-15000 Pa, act on the microstructure of frozen aerated slurries like ice cream [in which more than 50-60% of the freezable continuous liquid phase, in general water, is frozen], all typical disperse structuring components like ice crystals, air cells and fat globules or agglomerates thereof are more finely structured. This happens to such an extent, that scoop ability and creaminess characteristics are most positively influenced, as long as the dissipated viscous friction energy is efficiently transferred to a cooling system at the same time.

This principle works independent of the apparatus choice and apparatus geometry if the presumptions of homogeneous shear force input, heat transfer and narrow residence time distribution are fulfilled for all volume units.

DETAILED DESCRIPTION OF THE INVENTION

The present invention relates to frozen or partially frozen concentrated water based aerated slurries like e.g. ice cream or other frozen deserts which are mechanically treated by means of mechanical tools generating shear flow with large acting shear stresses, thus reducing contained disperse phases like ice crystals/ice crystal agglomerates, gas/air cells and fat globules/fat globule aggregates in size. According to the present invention this shear treatment is applied to such an extent that in the final product the ice crystal mean diameter (mean value of the volume distribution) does not exceed 30 microns, 10 microns are not exceeded for the gas/air cell mean diameter and 100 microns for the fat globule aggregate diameter.

At the same time, the energy dissipation rate is kept smaller than the heat transfer rate to the cooling agent, because otherwise the ice crystals would partially or fully re-melt. Furthermore this mechanical treatment of the frozen aerated slurry is uniform with respect to the acting stresses and treatment time for each volume element of the mass.

According to the present invention, this is realized by applying the high shear forces at such low temperatures where more than 50 to 60% of the freezable water fraction is in the frozen ice crystal state.

The maximum freezable water fraction cg' is recipe-specific. For a pure watery sucrose solution between 75 to 80% are measured for cg'. If this maximum freeze concentration state is reached the remaining liquid water fraction is a highly concentrated sucrose syrup which solidifies in a glassy state if the temperature is further reduced thus undergoing the so-called glass transition temperature Tg'. If the added sugars have a lower molecular weight compared to sucrose, Tg' is shifted to lower temperatures, if larger e.g. oligo- and/or polysaccharide molecules are added Tg' is accordingly shifted to higher Tg' values. All molecules dissolved or colloidally dispersed in the continuous watery phase of the frozen aerated slurry have a related influence on the glass transition temperature Tg' of the mass. cg', denoting the freezable water fraction depends as well on the composition of the molecule species, which are solved in the continuous water phase.

If the ice crystal concentration reaches 50-60% of cg' (=50-60% of the freezable water in the frozen state), the liquid watery continuous phase is already in a highly concentrated syrup state containing e.g. sugars, polysaccharides and proteins in regular ice cream recipes.

EXAMPLES

Example 1

In a typical ice cream recipe with total dry matter content of about 40% (related to total mass) and 60% of water, a total freezable water fraction of 75% (cg'=0.75; related to the pure water phase) is equivalent to 45% of maximum frozen water content related to the total mass. If in such a system 50% of the freezable water are frozen, this is consequently equivalent to 22.5% of frozen water, related to the total mass. If the total non-dissolved solids fraction is calculated related to the total mass about 10% of fat globules/fat globule aggregates have to be added to the disperse ice crystal fraction of 22.5% (for this example). Such a slurry containing 32.5 weight % (=equal to about 32.5 volume % due to the density of the solids close to water density) of disperse phase is a highly concentrated suspension in which the solid particles sterically interact with each other if a shear flow is applied.

If such a concentrated suspension is additionally aerated with typically about 50% of gas/air volume related to the total volume under atmospheric pressure conditions, the liquid fluid phase is additionally, partially immobilized within the foam lamellae which leads to a further increase in aerated slurry viscosity.

According to these structure/phase conditions frozen aerated water slurries like conventional ice cream form a highly viscous mass with dynamic viscosities in the range of about 500-1500 Pas at shear rates of about 10 1/s, if 50% of the freezable water are frozen. Depending on freezing point depression and glass transition temperature Tg' which depend on the composition of ingredients which are soluble in the continuous water phase, the 50% frozen state (related to the freezable water fraction) is reached at different temperatures.

For conventional ice creams this is in the range of around −10 to −11° C. Related mean dynamic viscosities are around 1000 Pas (at shear rate of 10 l/s) as stated before. Further decrease in temperature related to further increase in frozen ice fraction, increases viscosity exponentially up to about 3000 Pas (shear rate 10 l/s) at −15° C. The related acting shear stresses at shear rates of 10 l/s are given by the product of dynamic viscosity and shear rate, which results in a shear stress of 30000 Pa at −15° C. for the example given before.

If such large shear forces are applied to the aerated frozen slurries, the specific mechanical power input (power per volume of the slurry) which is transferred into micro-structuring work as well as into viscous friction heat is approximately proportional to the dynamic viscosity and proportional to the square of the shear rate. This means for the given example, that at −15° C. and a shear rate of 10 l/s a power of about 3 kW per liter slurry will be dissipated. For comparison, at −12° C. there will be about 0.6 kW/liter.

The power input or respectively related energy input (=power×residence time) will partially be consumed by micro-structuring work within the partially frozen slurry causing air cell, fat globule/fat globule agglomerate and ice crystal/ice crystal agglomerate deformation and/or break-up. Another second major part of the power/energy input during shear treatment will be consumed by Coulomb friction between the solid disperse components and viscous friction within the continuous fluid phase.

If the friction energy is not efficiently transferred to a cooling medium via cooled walls or cooled shearing tools, local heating and re-melting of ice crystals has to be expected. Consequently the shear treatment in the highly frozen state at >50-60% of frozen water fraction (related to the freezable water fraction) will be limited by the heat transfer to the cooling medium.

According to the present invention the micro-structuring which is relevant to change the microstructure of frozen aerated slurries to such an extent, that scoop ability and creaminess are remarkably and significantly (based on consumer tests) improved, is reached in the low shear rate range between 1-50 l/s preferably 1-20 l/s at shear stresses acting in the range of 2000 to 75000 Pa, preferably between 10000 and 15000 Pa at ice crystal fractions larger than 50-60% of the maximum freezable fraction of the liquid (water) phase.

Conventionally ice cream as a well known frozen aerated slurry is continuously partially frozen in scraped surface heat exchangers so-called ice cream freezers. Air is dispersed in parallel in the flow around the rotating scraper blades. At a conventional draw temperature of about −5° C. the relative amount of frozen water is about 40% related to the freezable water fraction. An additional water fraction of about 30-40% (related to the freezable water fraction) is subsequently frozen in a hardening tunnel (−40° C. air temperature, 2-6 hours residence time) and finally another 20% in a cold storage room (−25 to −30° C.).

In contrast in the shear treatment according to the invention the frozen aerated slurry (e.g. ice cream) is continuously frozen to draw temperatures of about −12 to −18° C. and related fractions of the freezable water of about 50 to 80%. When the mass temperature decreases from −5 to about −15° C., viscosity increases by 2 to 3 decades.

High shear forces at low temperatures are forming a finely disperse microstructure (ice crystals, air cells, fat globules and agglomerates thereof). To obtain improved product quality with respect to scoop ability and creaminess, two disperse structure-related criteria classes are of importance:

1. Characteristic size below a critical size: ice crystals, air cells, fat globules and agglomerates thereof have to be smaller than specific critical diameters in order to avoid unwanted structure characteristics causing reduced consumer acceptance which were found to be about 50-60 microns to avoid iciness and roughness for the ice crystals and their agglomerates, about 30-40 microns for air cells to avoid too fast coalescence and structure break-down during melting in the mouth and about 30-100 microns for fat globule agglomerates to avoid a buttery and/or fatty mouthfeel. Due to the existence of size distributions these criteria have to be interpreted as 90% in number of the related disperse particles/agglomerates shall be below these critical diameter values.

2. Increased fraction within a specific size range: ice crystals, air cells, fat globules and agglomerates thereof shall be in a specific diameter range in order to enhance positive sensory and stability characteristics. At least 50% in number of ice crystals/ice crystal agglomerates in a size range between 5 and 30 microns (or mean value below 8-10 microns) together with a low degree of ice crystal interconnectivity improve scoop ability and creaminess. At least 50% in number of air cells in the diameter range between 2-10 microns (or mean value below 8-10 microns) delays bubble coarsening by coalescence during melting in the mouth so strongly, that creaminess sensation is significantly enhanced. The volume of fat globules/fat globule agglomerates in the size range between 2-20 microns have a significant direct impact on improving creaminess sensation in the mouth and also contribute to increased air cell structure stability against coalescence thus supporting also indirectly the creaminess attribute.

The criteria under class 1 are partially fulfilled by existing processing techniques for ice cream. The criteria package under class 2 is only fulfilled by the present invention-based treatment of related aerated frozen slurries in shear flows according to the shear rate, shear stress, mechanical power consumption and heat transfer criteria described in detail herein.

Example 2

In the following using ice cream as a typical aerated frozen slurry example, the structure criteria given before as well as the relationship to the sensory characteristics of scoop ability and creaminess shall be exemplary described.

In micro-structuring studies in accordance with the present invention, the influence of low temperature, low shear treatment at ice crystal fractions larger than 50-60% has been investigated for a conventional vanilla ice cream with total dry matter content of 38% including 8% of milk fat and compared with conventionally treated/manufactured ice cream.

Figure 1:
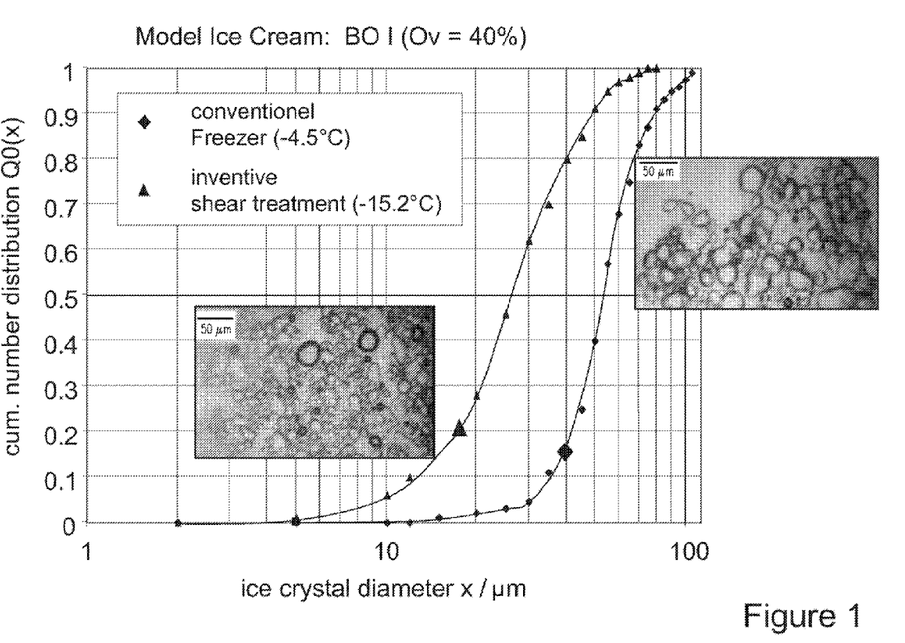
FIG. 1 is a graph illustrating ice crystal diameter vs. cumulative number distribution of the present invention vs. a conventional freezer.

For this ice cream system it was shown that the mean ice crystal size in the freshly produced ice cream by low temperature, low shear treatment was reduced by the factor of 2-3 compared to a conventionally freezered (scraped surface heat exchanger) and hardened ice cream of the same recipe. The related size distribution functions of the ice crystals are given in FIG. 1.

Figure 2:
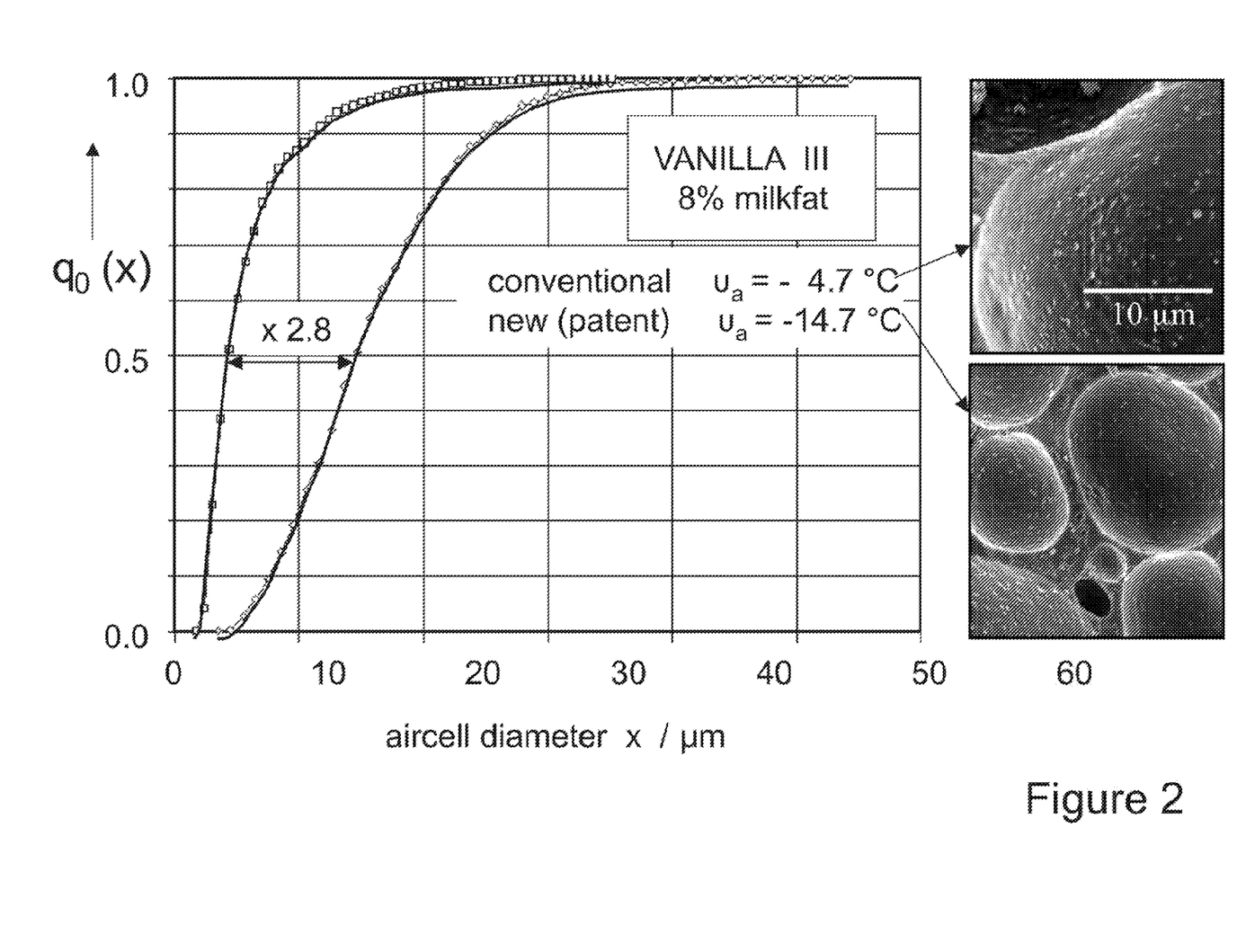
FIG. 2 is a graph illustrating aircell diameter of the present invention vs. a conventional freezer.

Air cell sizes were also reduced by a factor of 2.8 using the inventive low temperature low shear treatment as demonstrated in FIG. 2.

Figure 3:
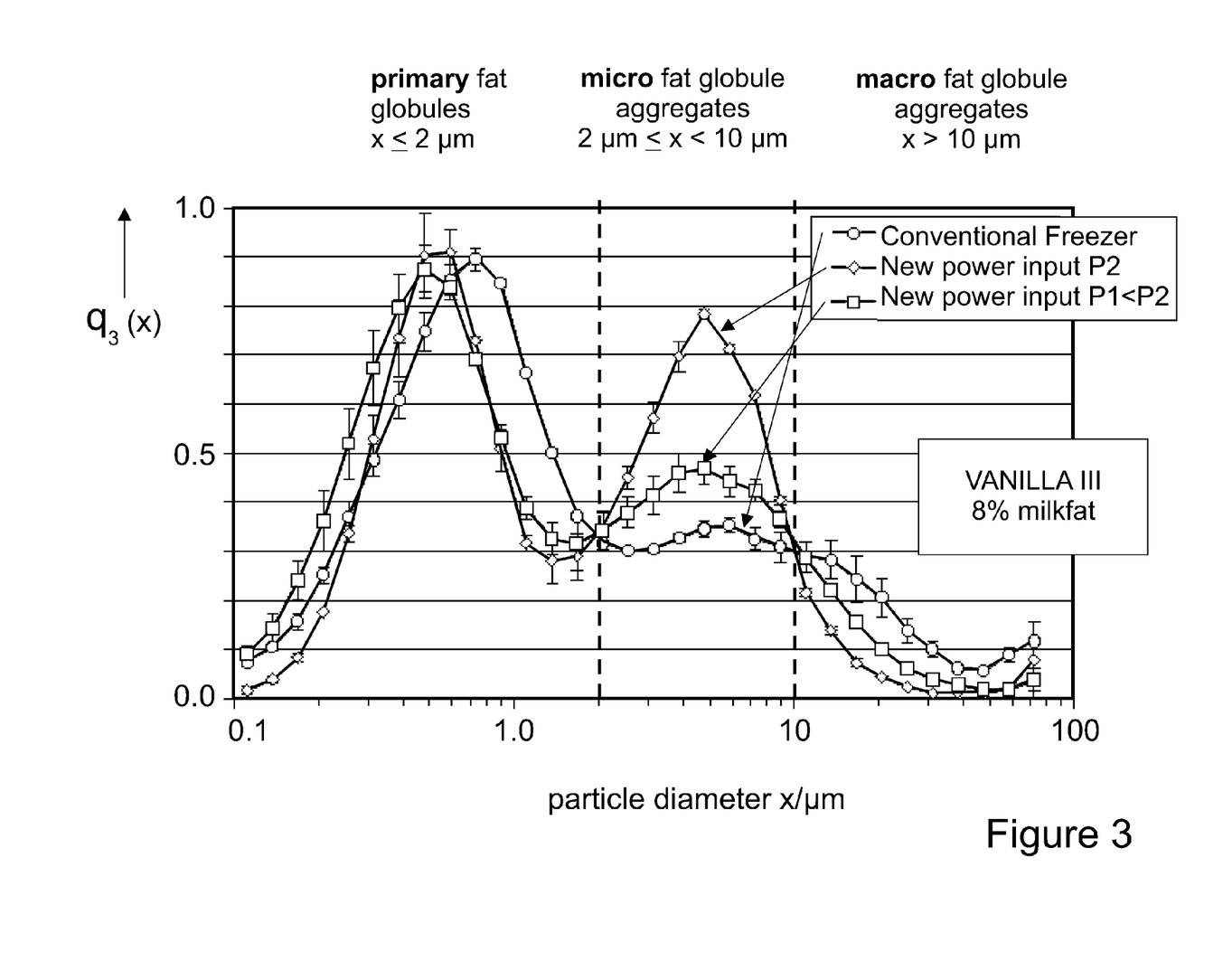
FIG. 3 is a graph illustrating milk fat particle diameter of the present invention vs. a conventional freezer for 8% milk fat ice cream formulation.
Figure 3A:
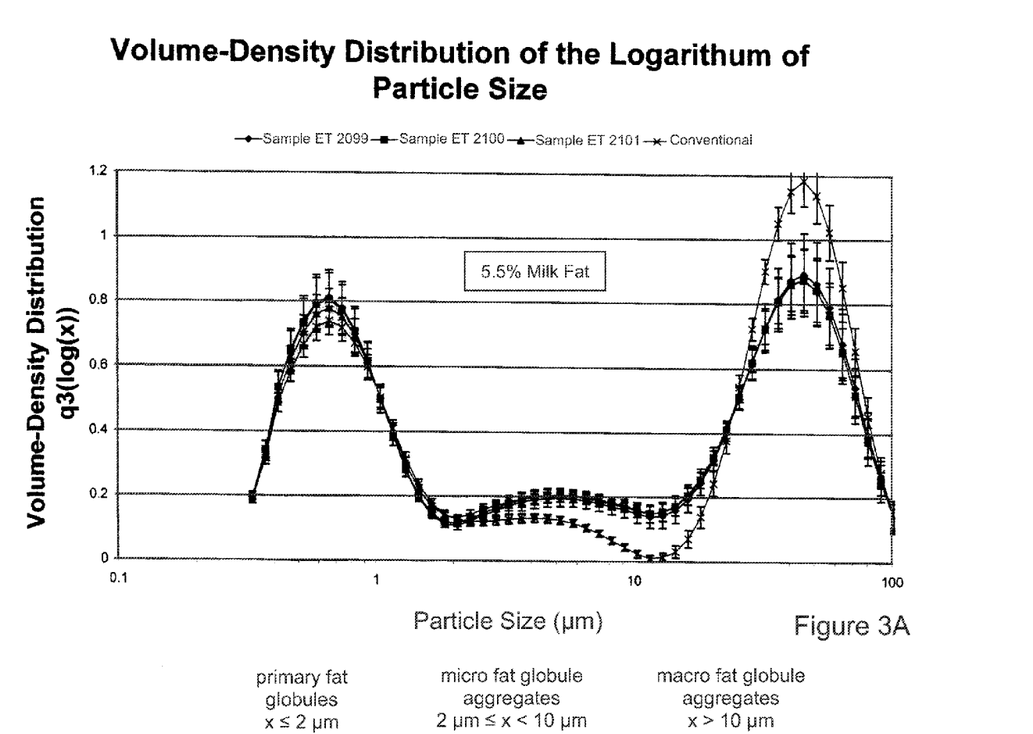
FIG. 3A is another graph illustrating particle diameter of the present invention vs. a conventional freezer for 5.5% milk fat ice cream formulation.

The influence of low temperature low shear processing on the fat globule and fat globule aggregate structure is given in FIG. 3 for a 8% milk fat containing ice cream formulation. Most significant changes in the fat globule aggregate size distribution are seen in the size range of 2-20 microns where a two-fold increase with the inventive treatment is reached compared to the conventional Freezer treatment. Furthermore using two levels of high shear for the inventive treatment, both under required heat transfer conditions, increased shear stress leads to an increased fraction of fat globule aggregates in the denoted size range. Similar trends are shown in FIG. 3A for a 5.5% milk fat containing ice cream formulation. The size range of 2-20 micron is increased at least two-fold. Simultaneously the larger fat globule aggregate size distribution in the range of 20-100 micron, resulting in an unpleasant buttery and/or fatty mouthfeel, is significantly reduced.

Within the following paragraph, the relationships of disperse microstructure and sensory perception of scoop ability and creaminess shall be explained. A crucial analytical tool to describe the microstructure-sensory quality relationships is rheometry which deals with flow measurements in order to characterize viscous and elastic material functions which are then correlated with the sensory characteristics of scoop ability and creaminess received from consumer tests.

The relevant rheological test is a small deformation shear test (oscillatory shear) which is adapted to the typical flow characteristics in the consumer's mouth between tongue and palate. Consequently two parallel plates, simulating tongue and palate are used between which a tablet like cut sample of the frozen aerated slurry (here: ice cream) is placed and slightly compressed to fix it. The surfaces of the two plates are of well-defined roughness in order to avoid wall slip effects. The shear frequency is also adapted to typical moving frequencies of the tongue relative to the palate in testing creaminess between 0.5 and 2 Hertz (here 1.6 Hz fixed). The shear amplitude is chosen rather small, such that non-linear effects in the stress-strain dependencies are minimized. During oscillatory shear the temperature of the sample is changed from −20 (initial storage state) up to +10° C. which represents the fully melted state in the mouth. The time for the temperature sweep is fixed to 1 hour in order to get the sample fully equilibrated for each temperature increment.

The rheological characteristics measured are the so-called storage modulus G' representing the elastic material properties and the loss modulus G" describing the viscous properties of the sample. From the elastic modulus G' the networking properties of the disperse structure like interconnectivity can be derived, from the viscous modulus G" the viscous shear flow behavior is received.

It was shown that both moduli G' and G" show a typical dependency from temperature which consists of a more or less pronounced plateau value domain in the temperature range between −20° C. and −10° C. (zone I), a strong decrease of the moduli in the temperature range between −10° C. and 0° C. (zone II) and a plateau domain of the moduli in the "high temperature" range between 0° C. and +10° C. (zone III) as demonstrated in FIG. 4.

Ice cream samples were drawn either after conventional freezing or low temperature low shear treatment exemplary carried out in an extruder device. In order to guarantee a high reproducibility of the rheological measurements a constant sample preparation procedure was performed prior to oscillation rheometry. At a temperature of about −20° C. ice cream tablets with a diameter of 25 mm and a height of 5 mm were formed a using cylindrical cutting device. The samples were then stored at a temperature of −20° C. and measured either directly after or 24 hours after preparation.

Figure 5:
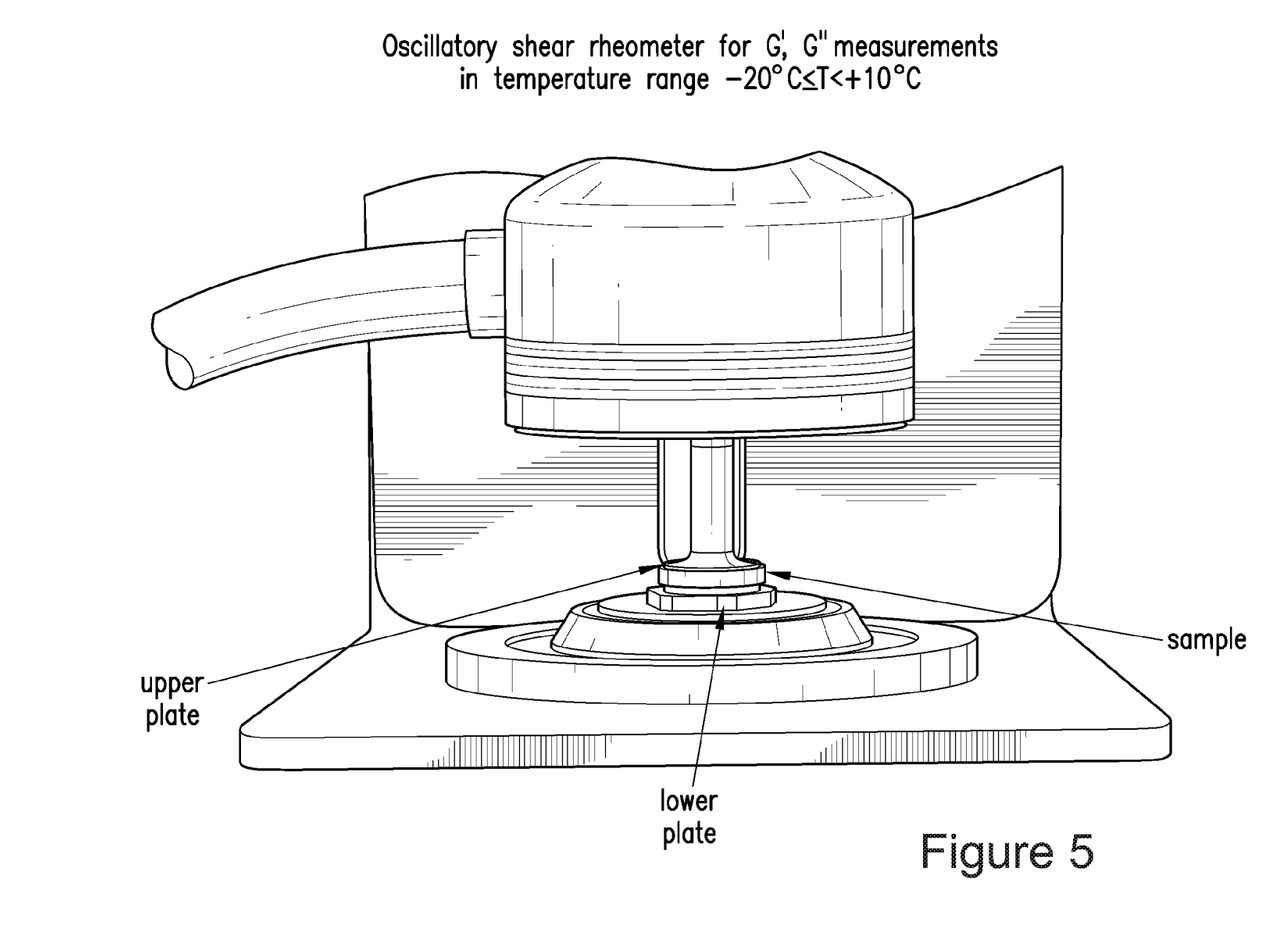
FIG. 5 illustrates an oscillatory shear rheometer.

The oscillatory shear measurements were carried out using a rotational rheometer (Physica MCR 300, shown in FIG. 5) with a plate-plate geometry (diameter 25 mm). Using Peltier-elements at the upper and lower plate a negligible temperature gradient within the sample was achieved. A moveable hood covering the plate-plate geometry prevented the heat exchange with the environment.

Figure 6:
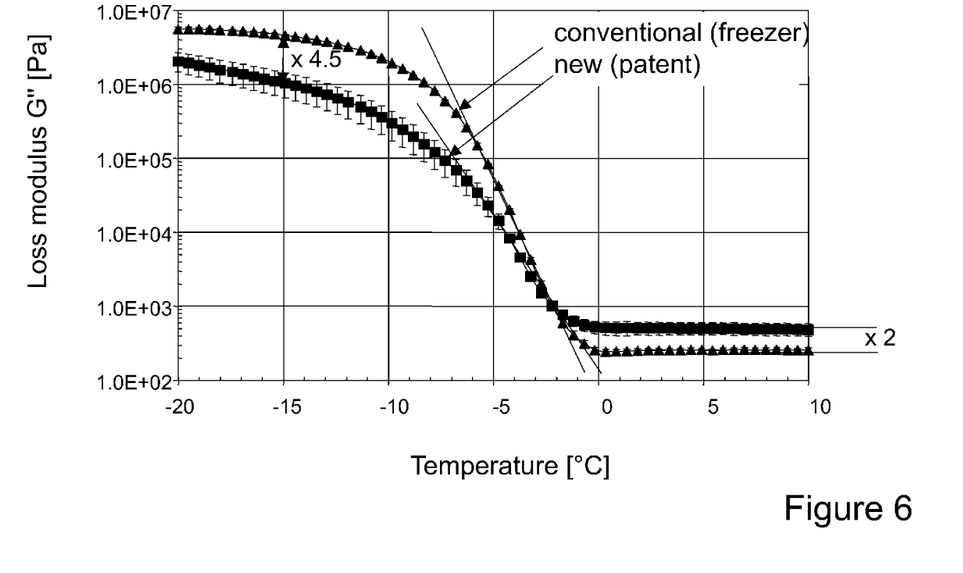
FIG. 6 is a graph illustrating storage/loss moduli vs. temperature of the present invention vs. a conventional freezer.

The results of measurements with conventionally and low temperature low shear treated samples are given in FIG. 6. These results are interpreted within the three zones I-III as follows taking the related microstructure into account:

Zone I: (−20° C. to −10° C.)

Figure 4:
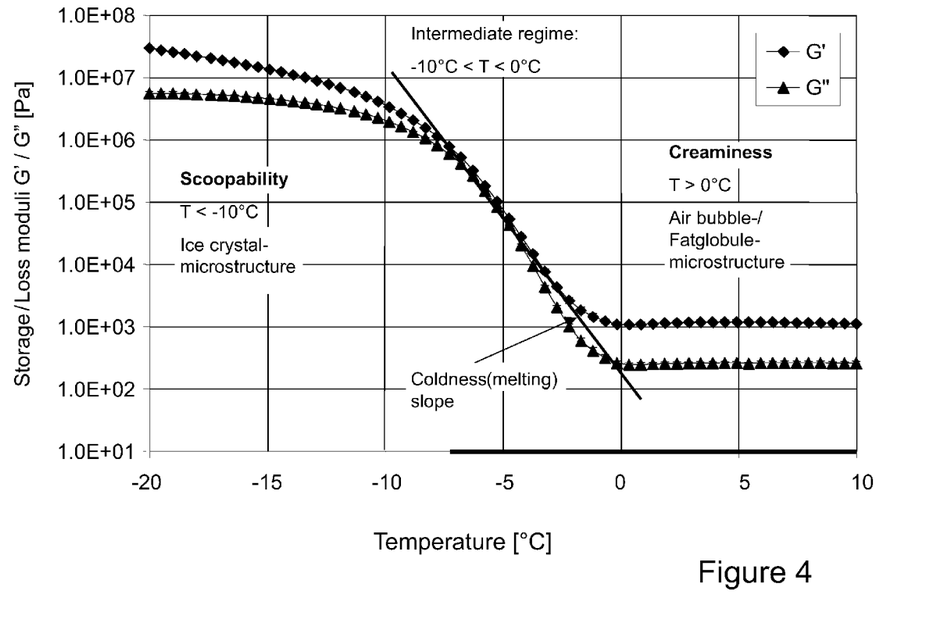
FIG. 4 is a graph illustrating storage/loss moduli vs. temperature of the present invention vs. a conventional freezer.

The ice crystal microstructure is dominating the rheological behavior. A more pronounced decrease of the elastic modulus G' in comparison to G" from −20° C. to −10° C. can be attributed to the decrease of the solid body like behavior and loss of interconnectivity of ice crystals with decreasing ice fraction. The loss modulus, shows an upper slightly pronounced plateau level, which corresponds to the viscous behavior and flow-ability of ice cream in the low temperature range (FIG. 4). In sensory terms the level of G' and G" below a temperature of −10° C. can be correlated to the rigidity and scoop ability of ice cream. The samples which were treated according to the inventive procedure show a strongly reduced plateau value of the moduli in this temperature zone I compared to the conventionally processed samples (factor 4.5 at −15° C.) thus clearly indicating the reduced rigidity and reduced interconnectivity of the ice crystal structure (FIG. 6 exemplary for the G" temperature dependency).

Zone II: (−10° C. to 0° C.)

As the ice crystals are melting and losing connectivity completely with increasing temperature in this zone, G' and G" are decreasing more rapidly (FIG. 4). The steeper the slope of the G'/G"-temperature functions the faster the ice cream melts. Faster melting requires a larger heat flux from the mouth to the ice cream sample. Consequently a steep slope corresponds to a more pronounced sensorial impression of coldness. The samples which were treated according to the inventive procedure show a reduced slope of the G" temperature dependency (FIG. 6) indicating the sensory impression of a "warmer" mouth feel during melting and/or a higher melting resistance.

Zone III:

In the temperature range between 0 and 10° C. G' and G" show a well-defined lower plateau level (FIG. 4). All ice is melted in this temperature range, therefore only the disperse air- and fat-phases have an impact on the rheological and quality characteristics. The loss modulus G" plateau in this temperature zone is highly correlated to the perception of creaminess. The samples which were treated according to the inventive procedure show a strongly increased plateau value of G" (factor 2) in this temperature zone III (FIG. 6) compared to the conventionally processed samples thus indicating the increased foam structure stability of the melted system which is supported by smaller air cell size and improved stabilization of these air cells by more efficient fat globule aggregates in the size range between 2 and 20 microns.

The Correlation between Oscillation Thermo-Rheometry (OTR) and sensorial perception studies of ice cream scoop ability and creaminess were investigated with a trained panel of 7 experts. In the related sensorial studies it was shown that scoop ability and creaminess of ice cream can be closely correlated with the upper loss modulus G"-plateau values in the low temperature zone I (scoop ability) and the lower G"-plateau values in the high temperature zone III (creaminess). The scoop ability and creaminess were classified by the panelists according to a 6 point sensory scale with 6 being the highest positive score.

Figure 7:
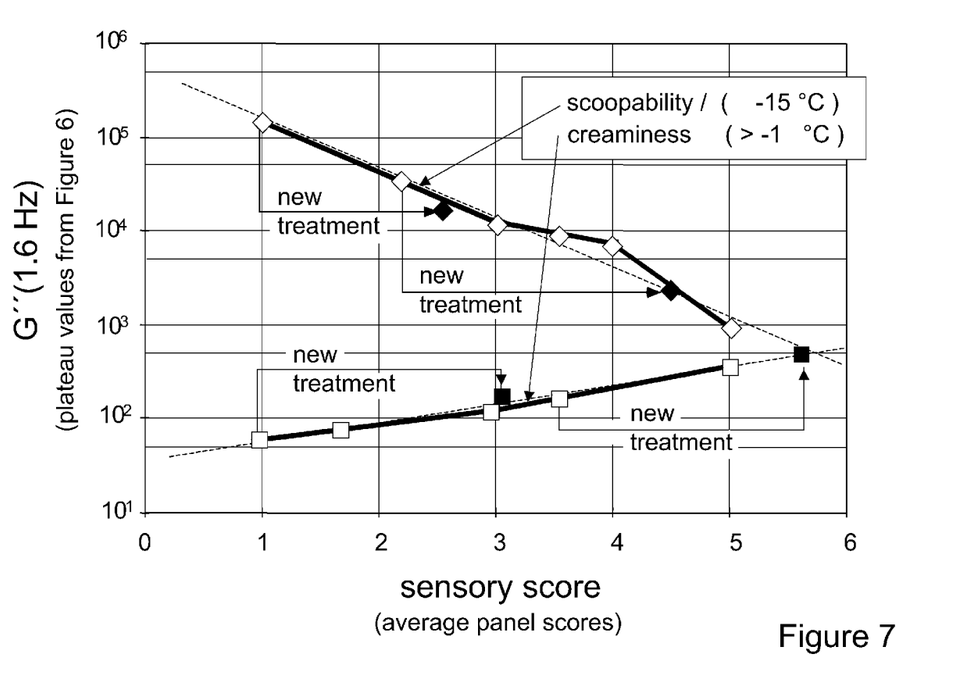
FIG. 7 is a graph illustrating sensory scores of the present invention vs. conventional products.

In FIG. 7 the average sensory score values of the 8 panelists is related to the measured G" plateau values in the low temperature and high temperature zones I and III. Both characteristics for scoop ability and for creaminess fit to an exponential relationship as indicated by the straight approximation of the functional dependencies in the semi-logarithmic plot (log G" versus sensory average score).

Scoop ability got a higher score for lower G" plateau values in the low temperature zone I. The creaminess was evaluated the better the higher the G" high temperature (zone III) plateau value measured in the molten state.

Figure 8:
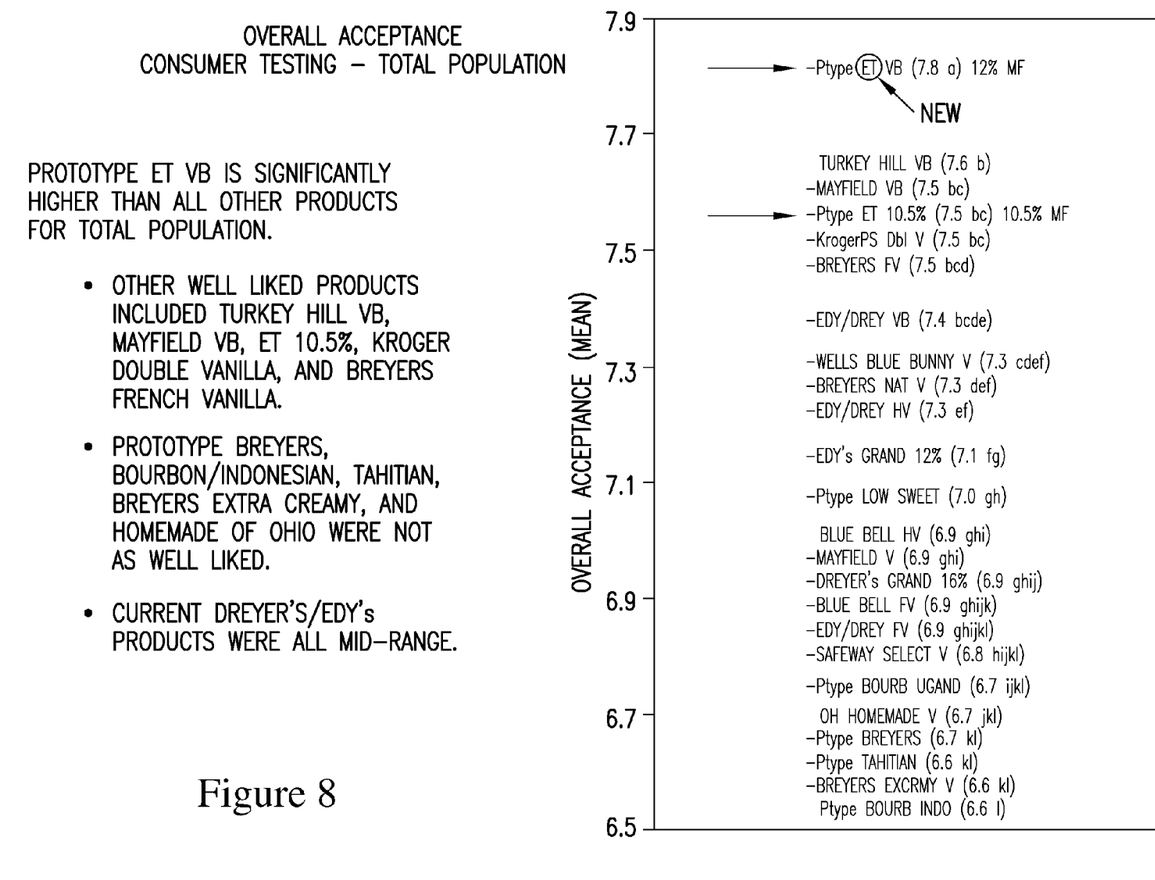
FIGS. 8 and 9 illustrate test market scores of the present invention vs. conventional products.

If conventionally processed ice cream was additionally treated with the inventive procedure the G" plateau value decreased at a temperature of −15° C., but increased in the molten state (FIG. 6). As indicated in FIG. 8 the inventive treatment increased the sensory quality score on the sensory scale by about 1 point on a 9 point scale. However the functional dependency (curve) was still fitted. This was found for the scoop ability as well as for the creaminess attributes.

These results clearly indicate the impression of the sensory panelists that the inventive low temperature shear (LTS) treatment of ice cream samples improves the scoop ability and creaminess behavior of frozen aerated slurries strongly (FIG. 7). A shift of about 2 score points indicates the commercial and marketing related relevance of the inventive treatment.

Figure 9:
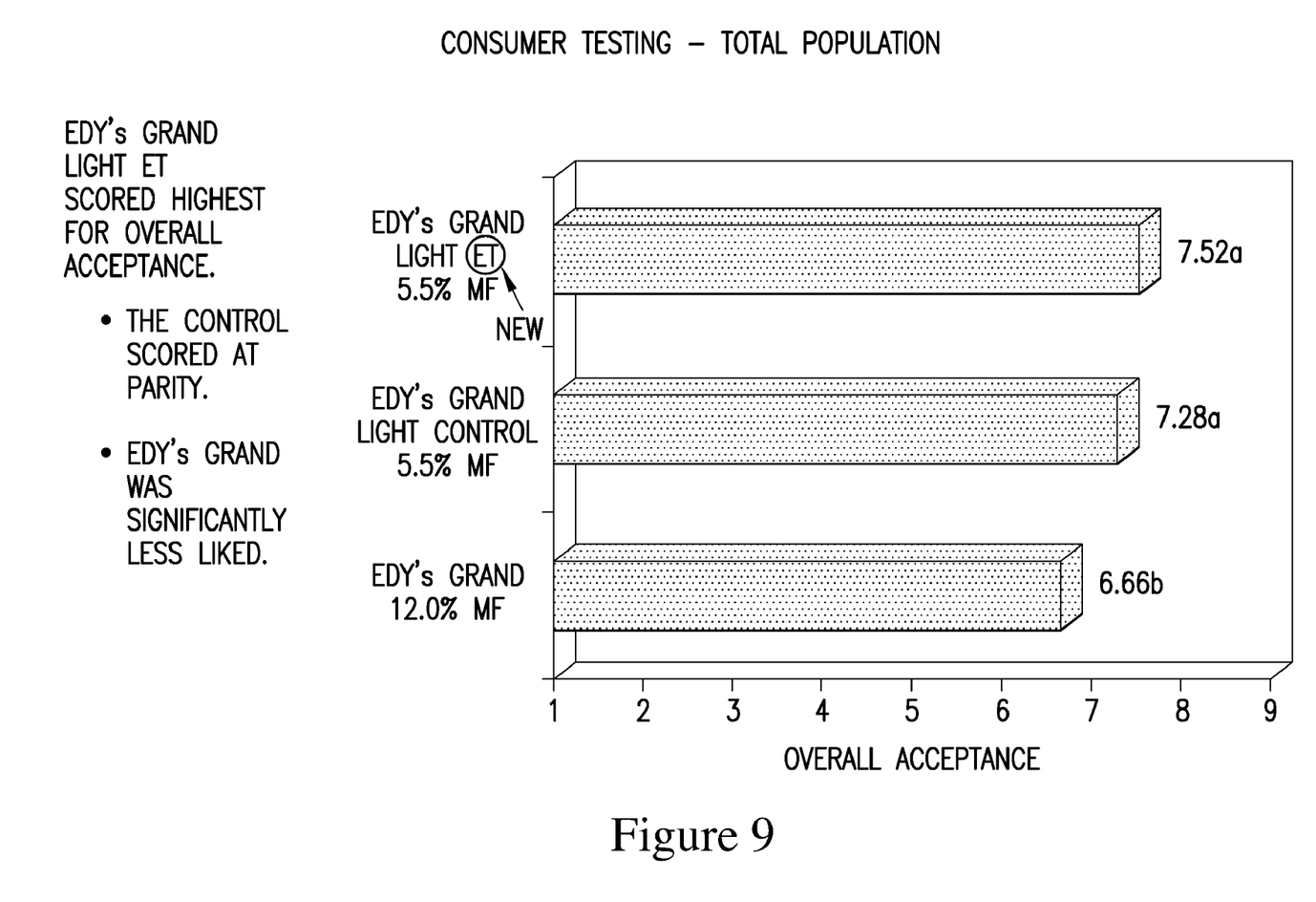

In order to confirm this outlook, market tests with LTS treated ice cream samples and conventionally processed ice cream samples of the same recipe have been performed on a test market. The market overall acceptance scores significantly confirmed that the consumers of the test market gave clear preference to the LTS treated samples of the same recipes (indicated with "ET" in the list of tested products in FIGS. 8 and 9) compared to the conventionally produced ice creams.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for imparting enhanced creaminess to an aerated frozen suspension, which comprises:
    partially freezing a solution that includes a gas or air, a liquid watery fluid phase and a solid or semi-solid dispersed phase at a temperature of −10° C. to −18° C. in an extruder device under a shear force to form a partially frozen aerated suspension in which throughout the applied shear force over 55 to 80% of freezable water in the solution is converted to a frozen ice crystal state; and
    subjecting the partially frozen aerated suspension to subsequent freezing to convert any remaining freezable water to a frozen ice crystal state and form a aerated frozen suspension that contains a superfine microstructure of ice crystals that imparts enhanced creaminess compared to an aerated frozen suspension made by partially freezing the same solution conventionally at a temperature of about −5° C. wherein less than 55% of freezable water in the solution is initially converted to a frozen ice crystal state.

2. The method of claim 1, wherein the partial freezing is conducted by passing the solution through an extruder device at a temperature of −12° C. to −18° C.

3. The method of claim 1, wherein at least 60% of the freezable water is converted to ice crystals throughout during the partial freezing.

4. The method of claim 1, wherein the subsequent freezing is carried out in a hardening tunnel or a cold storage room at temperatures from −25° C. to −40° C.

5. The method of claim 1, wherein about 60% of the freezable water is converted to ice crystals throughout during the partial freezing and about 40% of the freezable water is converted to ice crystals during the subsequent freezing.

6. The method of claim 1, wherein about 70% of the freezable water is converted to ice crystals throughout the partial freezing and about 30% of the freezable water is converted to ice crystals during the subsequent freezing.

7. The method of claim 1, wherein over 55 to 60% of the freezable water is converted to ice crystals throughout the partial freezing, and the subsequent freezing is conducted to first freeze an additional fraction of about 30 to 40% of the freezable water in a hardening tunnel at −40° C. and then freeze the remaining freezable water in a cold storage room at a temperature of −25° C. to −30° C.

8. The method of claim 1, wherein 90% in number of the ice crystals have a diameter that is less than 50 to 60 microns, 90% in number of the air cells have a diameter that is less than 30 to 40 microns, and 90% in number of the fat agglomerates have a diameter that is less than 30 to 100 microns.

9. The method of claim 1, wherein at least 50% in number of the ice crystals have a diameter that is between 5 and 30 microns, at least 50% in number of the air cells have a diameter of between 8 and 10 microns, and more than 20% in volume of the fat globules or agglomerates have a diameter that is between 2 to 20 microns.

10. The method of claim 1, wherein the liquid watery fluid phase includes solutes and the dispersed phase includes gas/air cells, ice crystals and fat globules or aggregates.

11. The method of claim 1, wherein the dispersed phase is finely structured with ice crystals having mean diameters that are below about 50-60 microns.

12. The method of claim 1, wherein the superfine microstructure is created during the partial freezing step using shear stresses within the range of 2500 to 15000 Pa in an extruder device.

13. The method of claim 1, wherein the creaminess of the product is defined by a loss modulus G" in the range of $10^5$ to $5 \times 10^6$ Pa in the state where at least 60% of the watery phase related to the freezable water fraction is frozen; and wherein the loss modulus G" is measured in an oscillatory shear experiment at oscillation frequencies between 1 and 2 Hz at shear strain amplitudes in the linear viscoelastic range of the material where stress and strain are proportional.

14. The method of claim 13, wherein the creaminess of the product is further defined by a loss modulus G" is in the range of 300 to 5000 Pa in a totally melted state of the product at temperatures of +1 to +10° C.

* * * * *

UNITED STATES PATENT AND TRADEMARK OFFICE
CERTIFICATE OF CORRECTION

PATENT NO. : 7,670,635 B2 Page 1 of 1
APPLICATION NO. : 12/370528
DATED : March 2, 2010
INVENTOR(S) : Windhab et al.

It is certified that error appears in the above-identified patent and that said Letters Patent is hereby corrected as shown below:

Column 10:
Line 5 (claim 3, line 2), after "throughout" delete "during"
Line 11 (claim 5, line 2), after "throughout" delete "during"

Signed and Sealed this

Fourth Day of May, 2010

David J. Kappos
*Director of the United States Patent and Trademark Office*